US011237780B2

(12) United States Patent
Nakai

(10) Patent No.: US 11,237,780 B2
(45) Date of Patent: Feb. 1, 2022

(54) INFORMATION PROCESSING APPARATUS, METHOD FOR CONTROLLING THE SAME, AND STORAGE MEDIUM

(71) Applicant: CANON KABUSHIKI KAISHA, Tokyo (JP)

(72) Inventor: Hironobu Nakai, Komae (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/392,360

(22) Filed: Apr. 23, 2019

(65) Prior Publication Data

US 2019/0332339 A1 Oct. 31, 2019

(30) Foreign Application Priority Data

Apr. 27, 2018 (JP) .............................. JP2018-086500

(51) Int. Cl.
*G06F 3/12* (2006.01)
*G06F 21/31* (2013.01)

(52) U.S. Cl.
CPC .......... *G06F 3/1238* (2013.01); *G06F 3/1222* (2013.01); *G06F 3/1231* (2013.01); *G06F 3/1286* (2013.01); *G06F 21/31* (2013.01)

(58) Field of Classification Search
CPC ...... G06F 3/1238; G06F 3/1222; G06F 21/31; G06F 3/1231; G06F 3/1286; G06F 21/6218
See application file for complete search history.

(56) References Cited

U.S. PATENT DOCUMENTS

| 2009/0092106 A1* | 4/2009 | Nakayama | ......... H04N 1/00482 370/338 |
|---|---|---|---|
| 2013/0107316 A1* | 5/2013 | Kwon | ...................... H04L 45/54 358/1.15 |
| 2013/0141753 A1* | 6/2013 | Kamoi | .................. G06F 21/629 358/1.14 |
| 2014/0168698 A1* | 6/2014 | Okada | ................ H04N 1/00347 358/1.15 |
| 2014/0268218 A1* | 9/2014 | Yoda | .................. G06K 15/4045 358/1.15 |
| 2016/0291851 A1* | 10/2016 | Tomono | ............. H04N 1/00411 |
| 2017/0098006 A1* | 4/2017 | Agashe | .................. G06Q 50/01 |

FOREIGN PATENT DOCUMENTS

| JP | 2002-342041 A | 11/2002 |
|---|---|---|
| JP | 2015-101012 A | 6/2015 |

OTHER PUBLICATIONS https://files.bbystatic.com/z8SpM%2FnozrYtvHCV0%2B9ZCw%3D%3D/92a2b15b-6674-44e2-8020-272303f0ec64.pdf (Year: 2017).*

* cited by examiner

*Primary Examiner* — Huo Long Chen
(74) *Attorney, Agent, or Firm* — Canon U.S.A., Inc. IP Division

(57) ABSTRACT

An information processing apparatus includes first and second network interfaces, and a storage unit configured to store first management information corresponding to the first network interface and second management information corresponding to the second network interface, out of predetermined management information. The first management information is not changeable through the second network interface, and the second management information is not changeable through the first network interface.

8 Claims, 18 Drawing Sheets

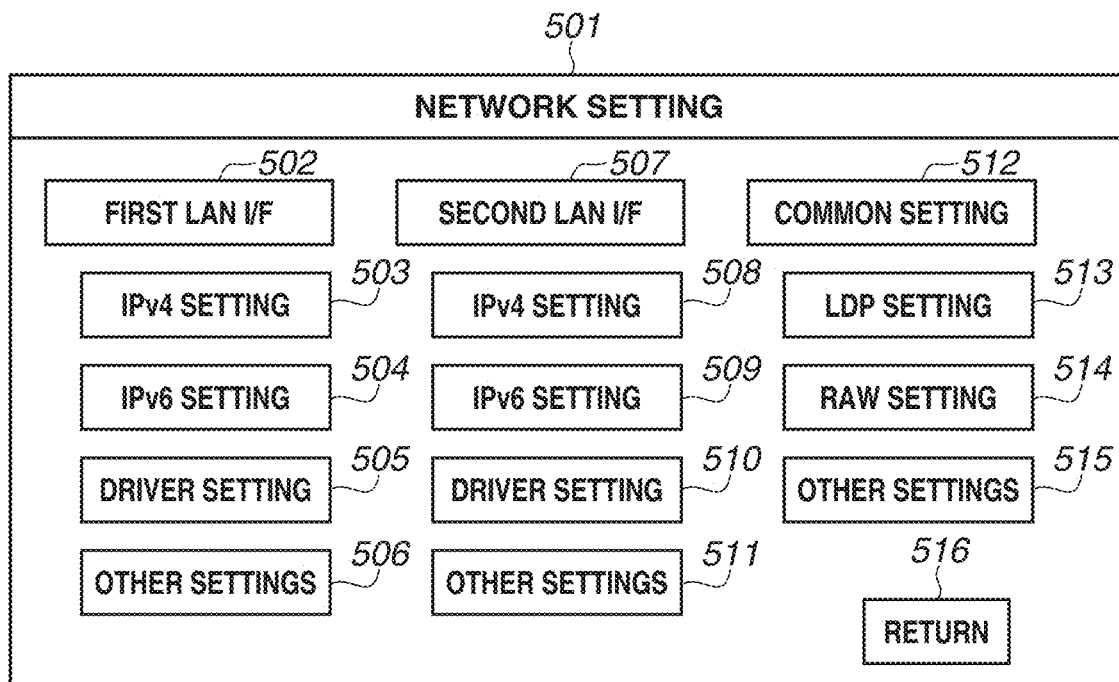
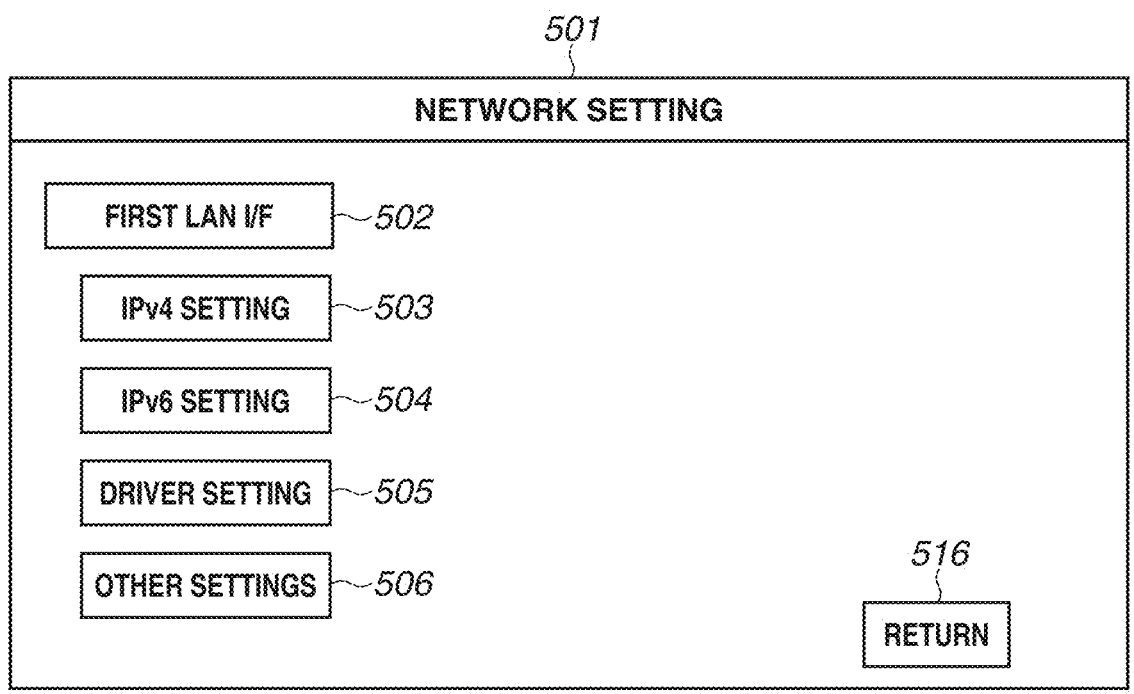

| NETWORK SETTING – I/F RESTRICTION SETTING |

602
I/F RESTRICTION: ☑ YES ☐ NO

RESTRICTION OF
"COMMON SETTING": ☑ YES ☐ NO

603

DISPLAY OF UNSETTABLE
SETTING VALUES: ☑ YES ☐ NO

604

605  606
[REFLECT SETTING] [RETURN]

NETWORK SETTING – FIRST LAN I/F – IPv4 SETTING

- 702 — USE IPv4: ☑
- ADDRESS SETTING  705  706  712  713
- REFLECT SETTING   RETURN
- PROTOCOL SELECTION: ☑ MANUAL ☐ DHCP
- 707 — IP ADDRESS: 192.168.10.5
- 708 — SUBNET MASK: 255.255.255.0
- 709 — GATEWAY ADDRESS: 192.168.10.1
- DNS SETTING
- PREFERRED DNS SERVER: 192.168.1.8 — 711

NETWORK SETTING – SECOND LAN I/F – IPv4 SETTING

- 717 — USE IPv4: ☑
- ADDRESS SETTING  719  720  721  727  728
- REFLECT SETTING   RETURN
- PROTOCOL SELECTION: ☑ MANUAL ☐ DHCP
- 722 — IP ADDRESS: 172.16.176.13
- 723 — SUBNET MASK: 255.255.240.0
- 724 — GATEWAY ADDRESS: 172.16.191.254
- DNS SETTING
- PREFERRED DNS SERVER: 172.26.224.51 — 726

FIG.9

NETWORK SETTING – FIRST LAN I/F – DRIVER SETTING ~801

LINK SETTING ~802

- ● AUTOMATIC DETECTION
- ◎ 10BASE-T (DUPLEX)
- ◎ 10BASE-T (HALF DUPLEX)
- ◎ 100BASE-T (DUPLEX)
- ◎ 100BASE-T (HALF DUPLEX)
- ◎ 1000BASE-T (DUPLEX)

POWER SETTING ~803

- ☑ EEE (POWER SAVING) ~804  805
- ☐ LINK SPEED CHANGE IN SLEEP STATE
- ☑ ARP RESPONSE IN SLEEP STATE
- ☐ VALIDATION OF WOL ~807  806

OFFLOAD SETTING ~808

- 809 ~☐ TCP CHECKSUM OFFLOAD (IPv4)
- 810 ~☐ TCP CHECKSUM OFFLOAD (IPv6)

REFLECT SETTING ~811          RETURN ~812

FIG.11

| | | 1012 | 1013 |
|---|---|---|---|
| 1001 | SETTING FOR I/F | LAN 1 | LAN 2 |
| 1002 | IPv4 SETTING | | |
| 1003 | USAGE OF IPv4 | USE (1) | USE (1) |
| 1004 | IP ADDRESS SETTING | | |
| 1005 | PROTOCOL SELECTION | MANUAL (1) | MANUAL (1) |
| 1006 | IP ADDRESS | 192.168.10.5 | 172.16.176.132 |
| 1007 | SUBNET MASK | 255.255.255.0 | 255.255.240.0 |
| 1008 | GATEWAY ADDRESS | 192.168.10.1 | 172.16.191.254 |
| 1009 | DNS SETTING | | |
| 1010 | PREFERRED DNS SERVER | 192.168.1.8 | 172.26.224.51 |
| 1011 | ALTERNATE DNS SERVER | <NOT SET: 0.0.0.0> | 150.61.109.21 |
| | DHCP OPTION SETTING | □□□ | △△△ |
| | mDNS SETTING | □□□ | △△△ |
| | IPv6 SETTING | □□□ | △△△ |
| | USAGE OF IPv6 | □□□ | △△△ |
| | IP ADDRESS SETTING | □□□ | △△△ |
| | DNS SETTING | □□□ | △△△ |
| | mDNS SETTING | □□□ | △△△ |
| | WINS SETTING | □□□ | △△△ |
| | IP Sec SETTING | □□□ | △△△ |
| | IEEE802.1x SETTING | □□□ | △△△ |
| | Ethernet DRIVER SETTING | □□□ | △△△ |
| | LINK SETTING | □□□ | △△△ |
| | POWER SETTING | □□□ | △△△ |
| | OFFLOAD SETTING | □□□ | △△△ |

FIG.12

| | | |
|---|---|---|
| 1014 — SETTING COMMON TO I/FS | | |
| 1015 — FIREWALL SETTING | | |
| 1016 — IPv4 ADDRESS FILTER | | |
| 1017 — | TRANSMISSION FILTER | |
| 1018 — | USAGE | USE (1) |
| 1019 — | DEFAULT POLICY | PERMIT (1) |
| 1020 — | EXCEPTION ADDRESS 1 | 192.168.1.1 – 192.168.1.255 |
| 1021 — | EXCEPTION ADDRESS 2 | 192.168.111.10 |
| 1022 — | EXCEPTION ADDRESS 3 | 172.16.0.0 – 172.161.1.255 |
| 1023 — | EXCEPTION ADDRESS 4 | 172.20.33.55 |
| 1024 — | EXCEPTION ADDRESS 5 | <NOT SET: NULL> |
| | RECEPTION FILTER | . . . . . |
| | IPv6 ADDRESS FILTER | . . . . . |
| | TRANSMISSION FILTER | . . . . . |
| | RECEPTION FILTER | . . . . . |
| | MAC ADDRESS FILTER | . . . . . |
| | LPD PRINT SETTING | . . . . . |
| | RAW PRINT SETTING | . . . . . |
| | FTP PRINT SETTING | . . . . . |
| | WSD SETTING | . . . . . |
| | SNTP SETTING | . . . . . |
| | BMLinkS SETTING | . . . . . |
| | IPP PRINT SETTING | . . . . . |
| | HTTP SETTING | . . . . . |
| | USAGE OF HTTP | . . . . . |
| | Proxy SETTING | . . . . . |
| | SNMP SETTING | . . . . . |
| | SNMPv1 SETTING | . . . . . |
| | SNMPv3 SETTING | . . . . . |
| | E-Mail SETTING | . . . . . |
| | RECEPTION SERVER SETTING | . . . . . |
| | TRANSMISSION SERVER SETTING | . . . . . |
| | FORWARD SETTING | . . . . . |
| | DESTINATION RESTRICTION | . . . . . |

FIG.15

| MANAGED CONTENTS | TYPE OF CONTENTS |
|---|---|
| TONER STATE | COMMON |
| REMAINING AMOUNT OF SHEETS | COMMON |
| ERROR STATE | COMMON |
| ⋮ | |
| JOB HISTORY | FIRST LAN I/F |
| CHARGING INFORMATION | FIRST LAN I/F |
| ADDRESS BOOK | FIRST LAN I/F |
| ⋮ | |
| JOB HISTORY | SECOND LAN I/F |
| CHARGING INFORMATION | SECOND LAN I/F |
| ADDRESS BOOK | SECOND LAN I/F |
| ⋮ | |

1100 (table), 1101 (common group), 1102 (first LAN I/F group), 1103 (second LAN I/F group)

INFORMATION PROCESSING APPARATUS, METHOD FOR CONTROLLING THE SAME, AND STORAGE MEDIUM

BACKGROUND

Field of the Disclosure

The present disclosure generally relates to information processing and, more particularly, to an information processing apparatus, a control method for controlling the information processing apparatus, and a storage medium.

Description of the Related Art

An information processing apparatus including a plurality of network interfaces has been well-known (see Japanese Patent Application Laid-Open No. 2002-342041). One information processing apparatus can be shared by personal computers (PCs) in different networks of different organizations through connection of the networks to the respective network interfaces. Further, the information processing apparatus can prevent data transfer among the networks. Accordingly, a file in a file server on one network can be prevented from being accessed from the other network. Further, in the information processing apparatus discussed in Japanese Patent Application Laid-Open No. 2002-342041, the network setting can be set for each network interface.

Further, an information processing apparatus that manages management information such as an address book for each department with use of a department identification (ID) has been also well-known (see Japanese Patent Application Laid-Open No. 2015-101012).

In the existing technology, security among a plurality of networks can be maintained by separating the plurality of networks. Further, security of information in the information processing apparatus can be maintained by using the plurality of networks for respective departments and managing management information for each department with use of the department ID.

In the existing technology, however, it is necessary to allocate an ID such as a department ID for each management information in order to maintain security of the information in the information processing apparatuses among groups such as departments, which complicates management.

SUMMARY

The present disclosure is made in consideration of the above-described issues, and the present disclosure is related to preventing management information on one group from being changed by a user in another group, without troublesome management by users using the information processing apparatus including a plurality of network interfaces.

According to one or more aspects of the present disclosure, an information processing apparatus includes first and second network interfaces, and a storage unit configured to store first management information corresponding to the first network interface and second management information corresponding to the second network interface, out of predetermined management information. The first management information is not changeable through the second network interface, and the second management information is not changeable through the first network interface.

Further features of the present disclosure will become apparent from the following description of exemplary embodiments with reference to the attached drawings.

BRIEF DESCRIPTION OF THE DRAWINGS

FIGS. 5A and 5B are diagrams each illustrating an example of a network setting screen.

FIG. 7 is a diagram illustrating an example of a network setting screen.

FIGS. 8A and 8B are diagrams each illustrating an example of a network setting screen.

FIG. 9 is a diagram illustrating an example of a network setting screen.

FIG. 11 is a diagram illustrating an example of setting values managed by the information processing apparatus.

FIG. 12 is a diagram illustrating an example of setting values managed by the information processing apparatus.

FIG. 15 is a diagram illustrating an example of management information managed by the information processing apparatus.

DESCRIPTION OF THE EMBODIMENTS

Various exemplary embodiments, aspects and features of the present disclosure are described below with reference to the drawings. The following exemplary embodiments are not intended to limit the disclosure according to the appended claims, and all combinations of features described in the exemplary embodiments are not needed for the present disclosure.

Figure 1:
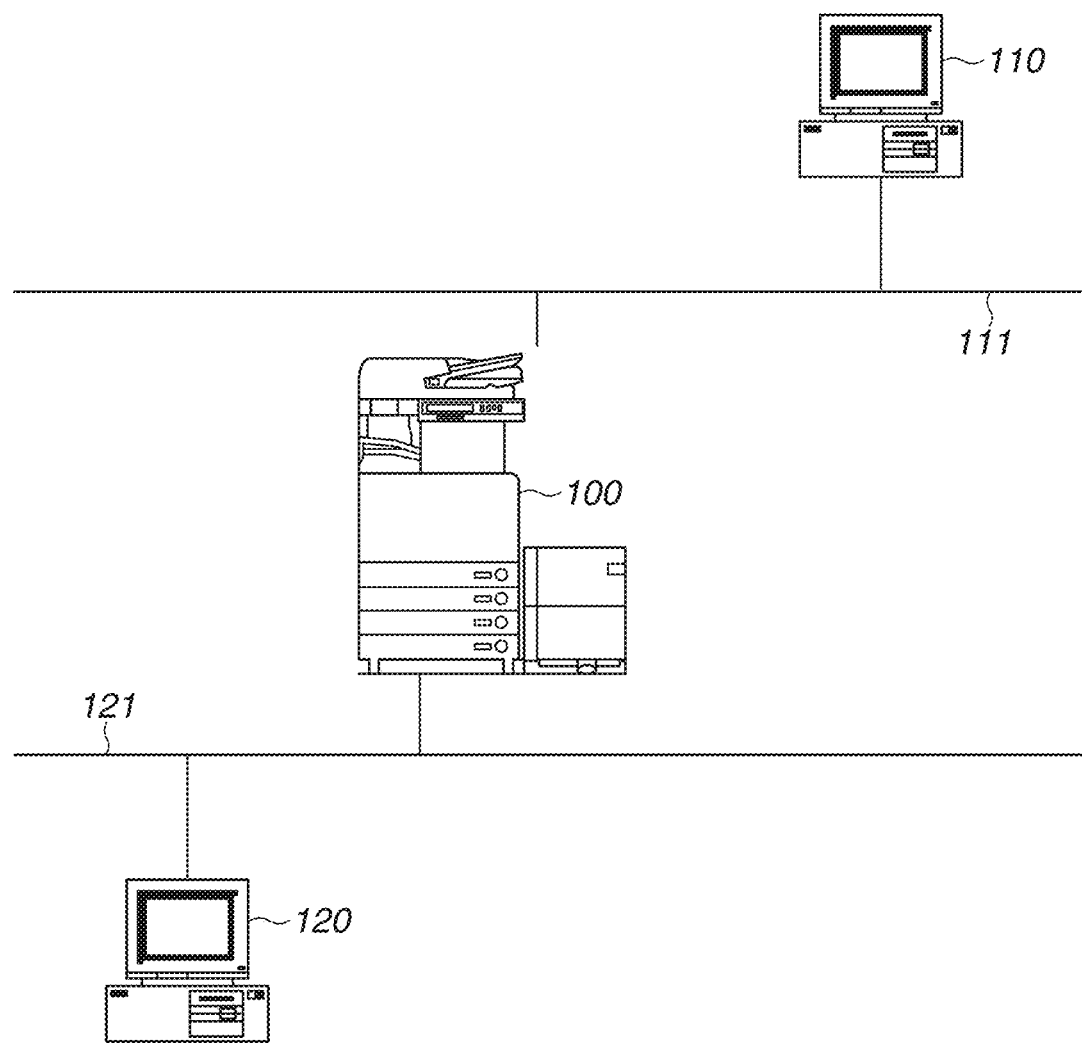
FIG. 1 is a diagram illustrating an example of a system configuration of a communication system.

First, an example of a system configuration of a communication system according to a first exemplary embodiment is described with reference to FIG. 1. The communication system according to the present exemplary embodiment includes an information processing apparatus 100 such as a multifunctional peripheral (MFP), a client personal computer (PC) 110, and a client PC 120.

The information processing apparatus 100 and the client PC 110 are connected through a local area network (LAN) 111, and the client PC 110 can transmit a print job to the information processing apparatus 100 through the LAN 111. The print job is data that includes an instruction to cause the information processing apparatus 100 to execute print processing, image data, and setting information. Further, the client PC 110 can acquire information stored in the information processing apparatus 100 through the LAN 111 and perform display of the information, and can perform setting of the information processing apparatus 100.

The information processing apparatus 100 and the client PC 120 are connected through a LAN 121, and the client PC 120 can transmit a print job to the information processing apparatus 100 through the LAN 121. Further, the client PC 120 can acquire information stored in the information processing apparatus 100 through the LAN 121 and perform display of the information, and can perform setting of the information processing apparatus 100. Two or more client PCs may be connected to each of the LAN 111 and the LAN 121.

Figure 2:
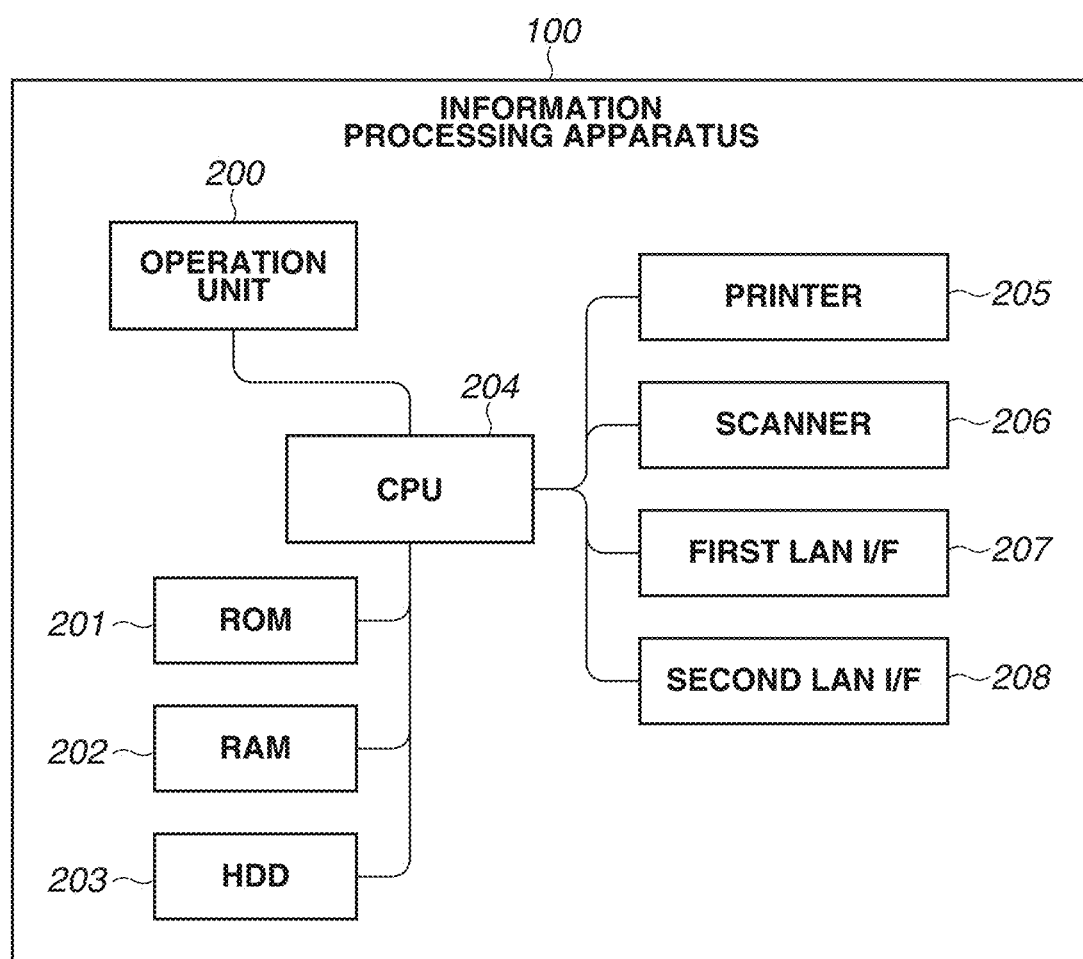
FIG. 2 is a block diagram illustrating an example of a hardware configuration of an information processing apparatus.

FIG. 2 is a block diagram illustrating an example of a hardware configuration of the information processing apparatus 100. The information processing apparatus 100 includes a read-only memory (ROM) 201, a random access memory (RAM) 202, a hard disk drive (HDD) 203, a printer 205, a scanner 206, an operation unit 200, and a central processing unit (CPU) 204 that controls these hardware devices. The information processing apparatus 100 further includes a first LAN interface (I/F) 207 for wired connection, and a second LAN I/F 208 for wired connection.

The CPU 204, which may include one or more processors, one or more memories, circuitry, or a combination thereof, may control the various kinds of hardware devices 200 to 203 and 205 to 208 configuring the information processing apparatus 100, thereby achieving functions of the information processing apparatus 100. The CPU 204 can mutually perform data communication with other hardware devices by transmitting a signal to the hardware devices through a bus line. In the present exemplary embodiment, the CPU 204 controls the various kinds of hardware devices 200 to 203 and 205 to 208; however, each of the hardware devices may include a CPU, and the CPUs may perform control in cooperation with one another.

The ROM 201 stores programs and various kinds of data to be used by the CPU 204. The RAM 202 is a work memory that temporarily stores data to be processed by the CPU 204. The HDD 203 stores various kinds of data, various kinds of programs, etc.

The printer 205 is a unit for achieving a print function, and performs processing to print an image based on, for example, image data included in a print job that has been received from the client PC connected to the wired LAN of the same network. Further, the printer 205 also performs processing to print an image of a document read by the scanner 206.

The scanner 206 is a unit for achieving a scan function, and performs processing to optically read a document set in the scanner 206 and to convert the read document into image data.

The first LAN I/F 207 and the second LAN I/F 208 are network connection units to connect to a wired LAN configured by Ethernet®, etc. In the present exemplary embodiment, the first LAN I/F 207 is connected to the LAN 111, and the second LAN I/F 208 is connected to the LAN 121.

Although the configuration in which the information processing apparatus 100 includes two wired LAN I/Fs has been illustrated in the present exemplary embodiment, the configuration is not limited thereto. For example, two wireless LAN I/Fs, a wired LAN I/F and a wireless LAN I/F, or three or more I/Fs may be provided. In a case of a configuration in which the information processing apparatus 100 includes two wireless LAN I/Fs, the information processing apparatus 100 can communicate with different networks as illustrated in FIG. 1 by setting an internet protocol (IP) address and designating an access point of a connection destination for each of the wireless LAN I/Fs.

The operation unit 200 is a user interface (UI) for a user of the information processing apparatus 100 to use the printer 205, the scanner 206, etc., and can receive operation and input as, for example, a touch panel. Further, the operation unit 200 can be used as a display unit that displays, for example, a setting screen, a print job history, an address book of the information processing apparatus 100.

The multifunctional peripheral including a printer and a scanner is described as an example of the information processing apparatus 100 according to the present exemplary embodiment. Alternatively, the information processing apparatus 100 may be other apparatuses such as a PC.

Next, an example of a software configuration of the information processing apparatus 100 according to the present exemplary embodiment is described with reference to FIG. 3.

Figure 3:
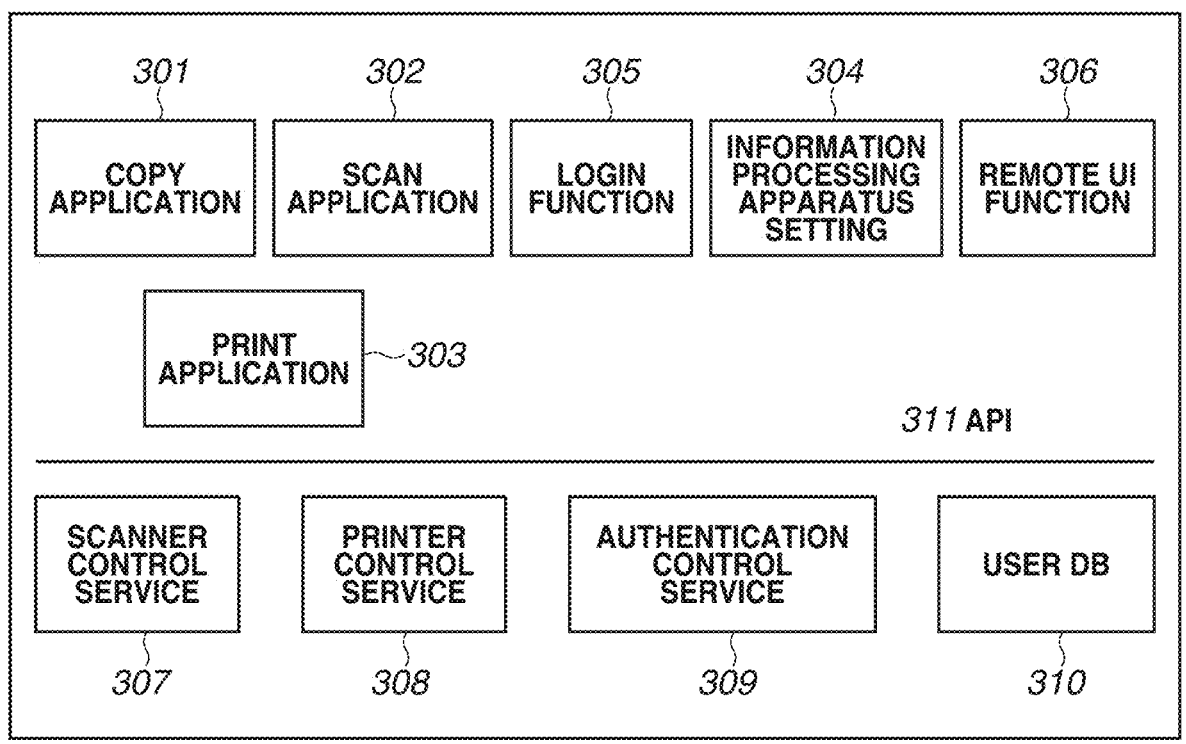
FIG. 3 is a block diagram illustrating an example of a software configuration of the information processing apparatus.

FIG. 3 is a block diagram illustrating an example of the software configuration of the information processing apparatus 100. The information processing apparatus 100 in FIG. 3 includes, as applications operating on a platform, a copy application 301, a scan application 302, and a print application 303.

The information processing apparatus 100 further includes applications for achieving an information processing apparatus setting 304 and a login function 305.

The information processing apparatus 100 includes a web server function for achieving a remote UI function 306, and can display error information, a sheet remaining amounts, an address book, etc. of the information processing apparatus 100, not on the operation unit 200 but on a display unit of the client PC. In addition, the information processing apparatus 100 can receive setting change and input of setting values of the network of the information processing apparatus 100 via the client PC with use of the remote UI function 306, and can acquire the input setting values from the client PC. Further, the above-described applications communicate with various kinds of control services through an application program interface (API) 311, to start up the applications.

The various kinds of control services are a module group including a scanner control service 307, a printer control service 308, and an authentication control service 309. Further, the various kinds of control services include a user database (DB) 310 that holds user information.

The copy application 301, the scan application 302, the print application 303, and the information processing apparatus setting application 304 each provide a user interface operable by the user.

The login function 305 provides a function allowing the user to log into the information processing apparatus 100. Management of the login user such as registration of new users and change of the user information is performed with use of the user DB 310.

The display of information and setting change of the information processing apparatus 100 are performed when the user performs display setting operation on the remote UI displayed on the client PC 110 or 120 to transmit the display request and the setting values to the information processing apparatus 100, and the information processing apparatus 100 receives the display request and the setting values.

Examples of the setting screen displayed on the remote UI are described below in description of FIG. 5A through FIG. 9.

In this case, for example, if a user of one group can change, through the remote UI, the network setting of the network I/F used by another group, a user using the changed network I/F cannot use the information processing apparatus. For this reason, there is an existing technique that manages the management information such as the network setting with use of a department identification (ID) or other information in order to prevent the management information from being changed by the user of different group. In the existing technique, however, it is necessary to allocate the department ID for each management information, which is troublesome.

To solve such an issue, in the present exemplary embodiment, the following processing is performed to prevent the management information on one group from being changed by a user in another group, without troublesome management by the users that use the information processing apparatus including a plurality of network interfaces. The following processing demonstrates features that are integrated into a practical application to improve a technological process associated with information processing.

Figure 4:
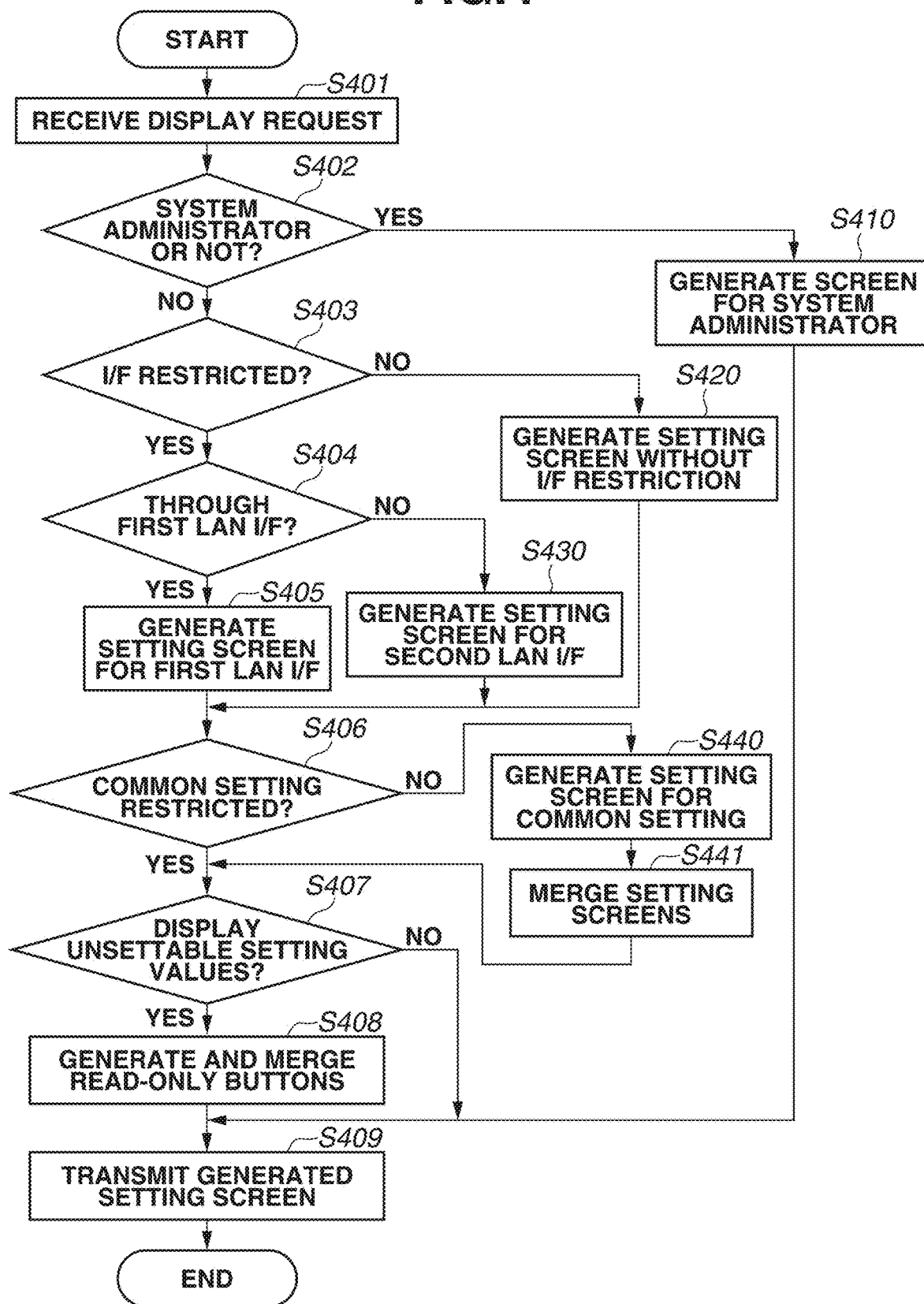
FIG. 4 is a flowchart illustrating an example of processing flow for setting screen display in the information processing apparatus.

FIG. 4 is a flowchart illustrating an example of processing flow for setting screen display in the information processing apparatus 100 according to the present exemplary embodiment. The CPU 204 reads out a program stored in the ROM 201 to the RAM 202 and executes the program, thereby achieving the processing in the flowchart of FIG. 4.

In step S401, the CPU 204 of the information processing apparatus 100 receives a request to display the setting screen from the client PC 110 through the first LAN I/F 207, or from the client PC 120 through the second LAN I/F 208. The display request received at this time may be a request to display a screen for displaying information such as a toner remaining amount, a sheet remaining amount, and history information.

In step S402, the CPU 204 determines whether the received display request has been issued from a system administrator. This determination is performed through determination whether a user ID as user identification information included in the display request corresponds to the system administrator. The user ID of the system administrator is previously set and stored in the HDD 203. In a case where the user identification information included in the display request is coincident with the user ID of the system administrator, the CPU 204 determines that the display request has been issued from the system administrator. On the other hand, in a case where the user identification information included in the display request is not coincident with the user ID of the system administrator, the CPU 204 determines that the display request has not been issued from the system administrator. As an example of the determination, the user IDs of the system administrators stored in the HDD 203 and the user ID included in the display request are compared to determine whether the user IDs of the system administrators include the user ID included in the display request. If it is determined that the display request has not been issued from the system administrator (NO in step S402), the processing proceeds to step S403. If it is determined that the display request has been issued from the system administrator (YES in step S402), the processing proceeds to step S410.

In step S403, the CPU 204 determines whether the I/F has been restricted, by referring to a setting value of a setting item 602 (I/F restriction). If it is determined that the I/F has been restricted (YES in step S403), the processing proceeds to step S404. On the other hand, if it is determined that the I/F has not been restricted (NO in step S403), the processing proceeds to step S420. The I/F restriction indicates restriction to prohibit display of information not corresponding to the I/F through which the display request has been received. The I/F restriction is settable on an I/F restriction setting screen 601 in FIG. 7.

FIG. 7 is a diagram illustrating an example of a network setting screen. FIG. 7 is a diagram also illustrating an example when the CPU 204 determines that the data has been received from the system administrator in the determination in step S402 and the setting screen generated in step S410 is displayed on the remote UI in the description of the flowchart of FIG. 4. The setting settable in the I/F restriction setting screen 601 in FIG. 7 may be settable in the operation unit 200 of the information processing apparatus 100.

The I/F restriction setting screen 601 is an example of the setting screen for I/F restriction setting. The setting change in the I/F restriction setting screen 601 can be performed by the system administrator. While the example in which the system administrator performs setting to validate or invalidate the I/F restriction is described in the present exemplary embodiment, the setting may be performed by, for example, a service engineer of a sales company without limitation.

The setting item 602 represents a setting whether to restrict a setting for each network I/F, and relates to the determination in step S403.

In step S404, the CPU 204 determines whether the request received in step S402 has been received through the first LAN I/F 207. If it is determined that the request has been received through the first LAN I/F 207 (YES in step S404), the processing proceeds to step S405. Otherwise (NO in step S404), the processing proceeds to step S430.

In step S405, the CPU 204 generates a setting screen corresponding to the first LAN I/F 207. The setting screen is generated by converting the setting items and the setting values corresponding to the LAN I/F stored in the HDD 203 as illustrated in FIG. 11, into data to be displayed on a web browser of an external PC other than the operation unit 200. For example, a setting screen like a network setting screen 501 illustrated in FIG. 5B is generated. The setting screen may be created in a language such as HyperText Markup Language (HTML), eXtensible Markup Language (XML), or a unique language.

FIG. 5B is a diagram illustrating an example of a network setting screen. An index 502 indicates that each of buttons 503 to 506 is to display a screen for inputting setting values of setting items for the first LAN I/F 207. The IPv4 setting button 503 is to display a screen for inputting setting values of IPv4 setting items for the first LAN I/F 207. The button 504 is to display a screen for inputting setting values of IPv6 setting items for the first LAN I/F 207. The button 505 is to display a screen for inputting setting values of driver setting items for the first LAN I/F 207. The button 506 is to display a screen for inputting setting values of other setting items for the first LAN I/F 207. For example, in a case where the IPv4 setting button 503 is pressed, a screen of the client PC is changed to a setting screen illustrated in FIG. 8A.

Next, in step S406, the CPU 204 refers to a setting value of a setting item 603 (restriction of "common settings") in FIG. 7 to determine whether common setting items have been restricted. The setting item 603 represents a setting whether to restrict common settings independent of I/F. The restriction of "common settings" used herein is a setting to restrict whether to display settings common to a plurality of network I/Fs, such as a line printer daemon (LPD) setting and a RAW setting displayed on the network setting screen 501 of FIG. 5A. When the restriction of "common settings" is set, the common settings can be browsed and changed only by the system administrator. If it is determined that the common setting items have been restricted (YES in step S406), the processing proceeds to step S407. On the other hand, if it is determined that there is no restriction (NO in step S406), the processing proceeds to step S440.

FIG. 5A illustrates an example of a network setting screen. An index 507 indicates that each of buttons 508 to 511 is to display a screen for inputting setting values of setting items for the second LAN I/F 208. The IPv4 setting button 508 is to display a screen for inputting setting values of IPv4 setting items for the second LAN I/F 208. The button 509 is to display a screen for inputting setting values of IPv6 setting items for the second LAN I/F 208. The button 510 is to display a screen for inputting setting values of driver setting items for the second LAN I/F 208. The button 511 is to display a screen for inputting setting values of other setting items for the second LAN I/F 208.

In step S440, the CPU 204 generates a setting screen including buttons 513 to 515 for common settings. The setting screen for common setting is generated by converting setting items and setting values stored in a data area without being associated with any network I/F, into data to be displayed on a web browser of an external PC other than the operation unit 200. Then, the processing proceeds to step S441.

Figure 6A:
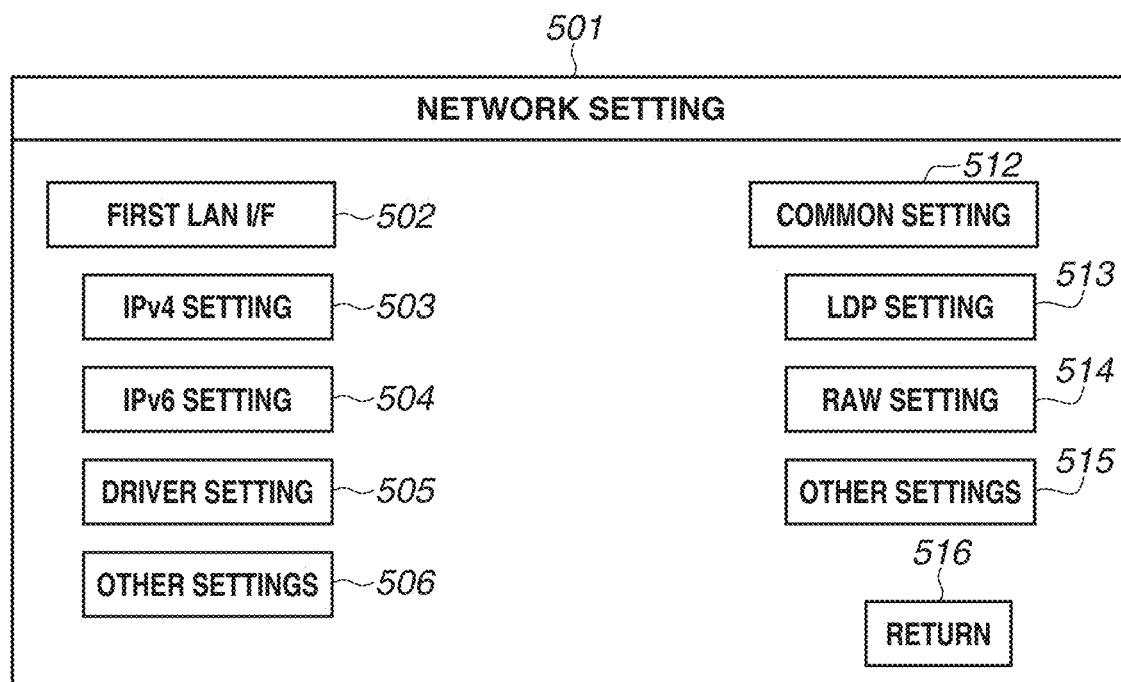
FIGS. 6A and 6B are diagrams each illustrating an example of a network setting screen.

In step S441, the CPU 204 performs processing to merge the buttons included in the setting screen generated in step S440 with the setting screen of the first LAN I/F 207 in order to display the buttons in the same screen. Then, the processing proceeds to step S407. At this time, for example, a screen like a network setting screen 501 illustrated in FIG. 6A is generated. FIG. 6A is a diagram illustrating an example of a network setting screen. An index 512 indicates that each of buttons 513 to 515 is to display a screen for inputting setting values of setting items common to the plurality of network I/Fs. The button 513 is to display a screen for inputting setting values of setting items relating to the LPD. The button 514 is to display a screen for inputting setting values of setting items relating to RAW printing using TCP Port 9100. The button 515 is to display a screen for inputting setting values of other common setting items.

Referring back to step S404, a case where it is determined in step S404 that the received request has been received through the second LAN I/F 208 is described.

In step S430, the CPU 204 generates a setting screen corresponding to the second LAN I/F 208. The setting screen is generated by converting setting items and setting values corresponding to each LAN I/F stored in the HDD 203 as illustrated in FIG. 11, into data to be displayed on a web browser of an external PC other than the operation unit 200. The setting screen may be created in a language such as HTML, XML, or a unique language.

Referring back to step S403, a case where the processing proceeds from step S403 to step S420 is described. In step S420, the CPU 204 generates a screen, like the network setting screen 501 illustrated in FIG. 5A, that includes an index and buttons corresponding to an I/F different from the I/F through which the request has been received in step S401. Then, the processing proceeds to step S406.

In step S407, the CPU 204 refers to a setting value (display of unsettable setting values) of a setting item 604 in FIG. 7 to determine whether the unsettable setting values are set to be displayed. The setting item 604 represents setting whether to perform only display of the setting items that are not changeable, i.e., that are restricted in setting, and the setting values thereof. When the unsettable setting values are set to be displayed, read-only buttons only to display the setting screen corresponding to the I/F different from the network I/F through which the request has been received, are displayed as the buttons 508 to 511 and 513 to 515 in FIG. 6B. The unsettable setting values are setting values, the setting screen for each of which has not been generated in the processing in or before step S407. If it is determined that the unsettable setting values are set to be displayed (YES in step S407), the processing proceeds to step S408. On the other hand, if the unsettable setting values are set not to be displayed (NO in step S407), the processing proceeds to step S409.

Figure 6B:
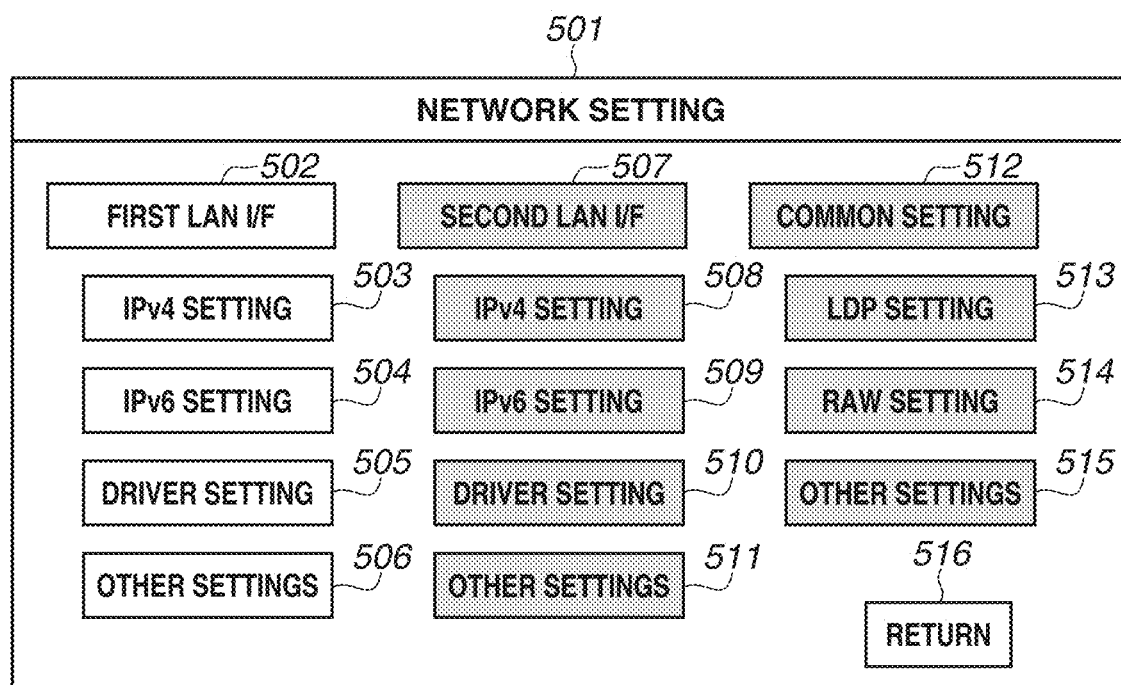

In step S408, the CPU 204 generates the read-only buttons to display a screen in which the unsettable setting values are displayed but are not settable, and performs the merging processing to display the read-only buttons on the screen the same as the setting screen generated in or before step S408. In this case, for example, grayout buttons like the buttons 508 to 511 in FIG. 6B are generated. The grayout buttons are pressable, and the CPU 204 displays the corresponding setting screen of the setting item when any of the buttons is pressed by the user, but the setting screen does not receive operation to change the setting. For example, in the setting screen as illustrated in FIG. 8B that is displayed after the IPv4 setting button 508 is pressed, an input field for an IP address may be uninputtable or a button 712 is not pressable if inputtable. The grayout buttons may be unpressable.

The description is returned to step S402, a case where the processing proceeds from step S402 to step S410 (YES in step S402) is described.

In step S410, the CPU 204 generates a setting screen that includes buttons to display setting items and setting values changeable only by the system administrator, for example, a setting screen like the I/F restriction setting screen 601 in FIG. 7. Thereafter, the processing proceeds to step S409.

In step S409, the CPU 204 transmits, as a response to the display request received in step S401, the generated setting screen to the client PC that has transmitted the display request in step S401. In a case where it is determined in step S402 that the received display request has been issued from the system administrator and the screen for the system administrator is generated in step S410, the CPU 204 transmits a setting screen to be displayed switched from the screen in FIGS. 5A, 5B, 6A, and 6B.

In the above description, the network setting screen 501 and the I/F restriction setting screen 601 are described as examples of the network setting screen according to the present exemplary embodiment. Now, an example of the setting screen displayed when any of the buttons in the network setting screen 501 is pressed and an example of a list storing the values input in the respective setting screens are described with reference to FIG. 8A through FIG. 12.

FIGS. 8A and 8B are diagrams each illustrating an example of a network setting screen that is displayed on the remote UI when the IPv4 setting button 503 or the IPv4 setting button 508 in FIG. 5A is pressed by the user.

FIG. 8A illustrates a setting screen for inputting settings relating to the IPv4 of the first LAN I/F. FIG. 8A illustrates a screen displayed when the IPv4 setting button 503 is pressed.

An IPv4 setting screen 701 is a display example of a screen to perform IPv4 setting for the first LAN I/F 207.

A setting item 702 is a setting item to set presence/absence of use of IPv4.

Setting items 705 and 706 are setting items of a protocol that performs IP address allocation. Manual in the stetting item 705 is selected to manually set setting items 707 to 709 described below, and the setting item 706 is selected to set the setting items 707 to 709 by dynamic host configuration protocol (DHCP).

The setting items 707, 708, and 709 are setting items for IPv4 IP address setting, subnet mask setting, and gateway IP address setting, respectively.

A setting item 711 is a setting item to set an IP address of a domain name system (DNS) server.

A button 712 is a button to reflect the set contents set in the IPv4 setting screen 701, and a return button 713 is a button to reject the set contents and to return to the network setting screen 501, which is the previous screen, in FIG. 5A. When the button 712 is pressed, the CPU 204 stores the setting values input by the user in the HDD 203 in association with the corresponding network I/F.

FIG. 8B illustrates a setting screen for inputting settings relating to the IPv4 of the second LAN I/F. FIG. 8A illustrates a screen displayed when the IPv4 setting button 508 is pressed. Setting items 717 to 726 and buttons 727 and 728 are similar to the setting items and the buttons in FIG. 8A. Thus, description thereof is omitted.

FIG. 9 is a diagram illustrating an example of a network setting screen displayed on the remote UI when the button 505 (driver setting button) in FIG. 5A is pressed by the user.

A driver setting screen 801 is a display example of a driver setting screen to perform setting for the first LAN I/F 207.

A setting item 802 is a setting item to set a link speed, and other items.

An index 803 indicates that setting items 804 to 807 are setting items relating to power of the first LAN I/F 207.

The setting item 804 is a setting item to set power saving of Energy Efficient Ethernet (EEE).

The setting item 805 is a setting whether to change the link speed of setting item 802 to that of 10BASE-T (half duplex) for further power saving when the information processing apparatus 100 transitions to a low-power sleep mode. The change of the link speed invokes link down and link up of the first LAN I/F 207.

The setting item 806 is a setting item to set whether to perform response to an address resolution protocol (ARP) request from another apparatus on the network while maintaining the sleep state after the information processing apparatus 100 transitions to the low-power sleep mode.

The setting item 807 is a setting item to set whether the information processing apparatus 100 transitions from a sleep state to a standby state when the information processing apparatus 100 receives a Wake-ON-LAN (WOL) packet from another apparatus on the network, after the information processing apparatus 100 transitions to the sleep mode.

An index 808 indicates that setting items 809 and 810 are setting items to set whether to perform offload processing with respect to transmission/reception of a packet.

The setting item 809 is a setting item of TCP checksum offload of an IPv4 packet, and the setting item 810 is a setting item of TCP checksum offload of an IPv6 packet. The checksum offload is processing to calculate a checksum with use of a hardware function of the network I/F and to add the checksum to the packet, thereby reducing a load on the CPU 204, in place of calculation of the checksum of the packet by software and adding the checksum to the packet.

A button 811 is to reflect the set contents set in the IPv4 setting screen 701, and a button 812 is to reject the set contents and to return to the previous screen in FIG. 5A.

When the button 811 is pressed, the setting values input by the user are stored in the HDD 203 in association with the corresponding network I/F.

Further, when the button 510 in FIG. 5A is pressed, a screen for the second LAN I/F 208 that is similar to the screen illustrated in FIG. 9 is displayed. When the button 504 or the button 506 is pressed, the corresponding screen for the first LAN I/F 207 is displayed, and when the button 509 or the button 511 is pressed, the corresponding screen for the second LAN I/F 208 is displayed.

Figure 10:
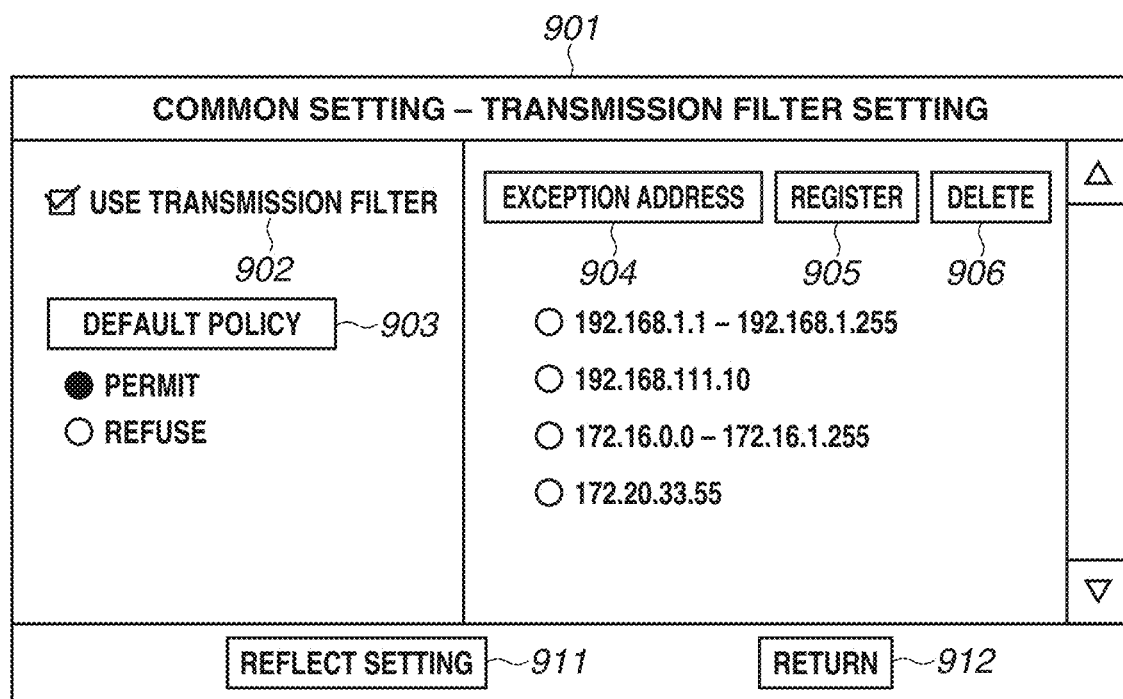
FIG. 10 is a diagram illustrating an example of a network setting screen.

FIG. 10 is a diagram illustrating an example of a network setting screen that is displayed on the remote UI when the button 515 in FIG. 5A is pressed by the user.

A transmission filter setting screen 901 is an example of a display screen displayed in a case where the user selects a not illustrated transmission filter setting in the "other settings" of the common setting.

A setting item 902 is a setting item to set whether to use a transmission filter function, and a setting item 903 is a setting item to set default policy. In a case where the default policy is "permitted", an address set in a setting item 904 is excluded from the default policy, i.e., communication with the address is refused. In a case where the default policy is "refused", the address set in the setting item 904 is excluded from the default policy, i.e., communication with the address is permitted. Accordingly, the operation of permitted/refused address in communication is inverted in response to the change of the default policy setting.

A button 905 is to perform registration of an exception address, and a button 906 is to delete the registered exception address.

A button 911 is a button to reflect the set contents set in the transmission filter setting screen 901, and a button 912 is to reject the set contents and to return to the network setting screen 501 of FIG. 5A (previous screen). When the button 911 is pressed, the setting values input by the user are stored in the HDD 203 in association with the corresponding network I/F.

FIG. 11 is a diagram illustrating an example of a list of the setting values associated with the network I/F.

A list 1001 stores setting information such as setting values of the network setting of the information processing apparatus 100 in association with the each network I/F. The setting information for the network setting or other settings are one piece of management information managed by the information processing apparatus 100. In the present exemplary embodiment, an example in which predetermined management information for the network setting, and other settings are associated with each network I/F is described. However, the association is not limited thereto. For example, the setting information for print setting and scan setting set for each network I/F, and language setting in the device setting may be stored in association with each network I/F.

A list 1012 is a list of the setting values of the network setting associated with the first LAN I/F 207. A list 1013 is a list of the setting values of the network setting associated with the second LAN I/F 208.

A setting item 1003 indicates the setting of usage of IPv4, and is set to 1 in a case where the IPv4 is used.

A setting item 1005 indicates the setting of protocol selection, and is set to 1 in a case of manual setting.

A setting item 1006 indicates the setting of an IP address, a setting item 1007 indicates the setting of a subnet mask, and a setting item 1008 indicates the setting of a gateway address.

A setting item 1009 indicates a DNS setting, a setting item 1010 indicates the setting of a preferred DNS server, and a setting item 1011 indicates the setting of an alternate DNS server. In addition, setting values of setting items to be set for each network I/F, for example, a DHCP setting and an IPv6 setting are similarly stored.

These setting values are configured as values associated to each of the first LAN I/F 207 and the second LAN I/F 208, and are stored in the HDD 203. These setting values are stored as file data, for example, "LAN1_setting_value. BIN" and "LAN2_setting_value. BIN".

These setting values are read by the CPU 204 of the information processing apparatus 100 from the HDD 203, and are used for the setting screen displayed on the display units of the client PCs 110 and 120 through the remote UI.

FIG. 12 is a diagram illustrating an example of a list of setting values in the common setting not associated with the network I/F. The following setting items correspond to the example of the setting screen illustrated in FIG. 10 described above.

A list 1014 stores the setting values of the network setting not to be set for each network I/F by the information processing apparatus 100.

A setting item 1018 indicates a setting whether to use a transmission filter of an IPv4 address filter, and is set to 1 in a case where the transmission filter is used.

A setting item 1019 indicates a setting of a default policy, and is set to 1 in a case where the default policy is permitted.

Setting items 1020 to 1024 respectively indicate settings of exception addresses 1 to 5. In addition, setting values of setting items common to all of the network I/Fs, for example, a reception filter of the IPv4 address filter, an IPv6 address filter, and a MAC address filter are stored.

Since these setting values are common to the network I/Fs, these setting values are stored in the HDD 203 without being associated with a specific network I/F. For example, these setting values are stored as file data, for example, "LAN_common_setting_value. BIN".

These setting values are read by the CPU 204 of the information processing apparatus 100 from the HDD 203, and are used for the setting screen displayed on the display units of the client PCs 110 and 120 through the remote UI.

An example of a setting change flow using the setting screen for the first LAN I/F 207 generated in the flow of FIG. 4 described above is described with reference to FIGS. 13, 14, and 16.

Figure 14:
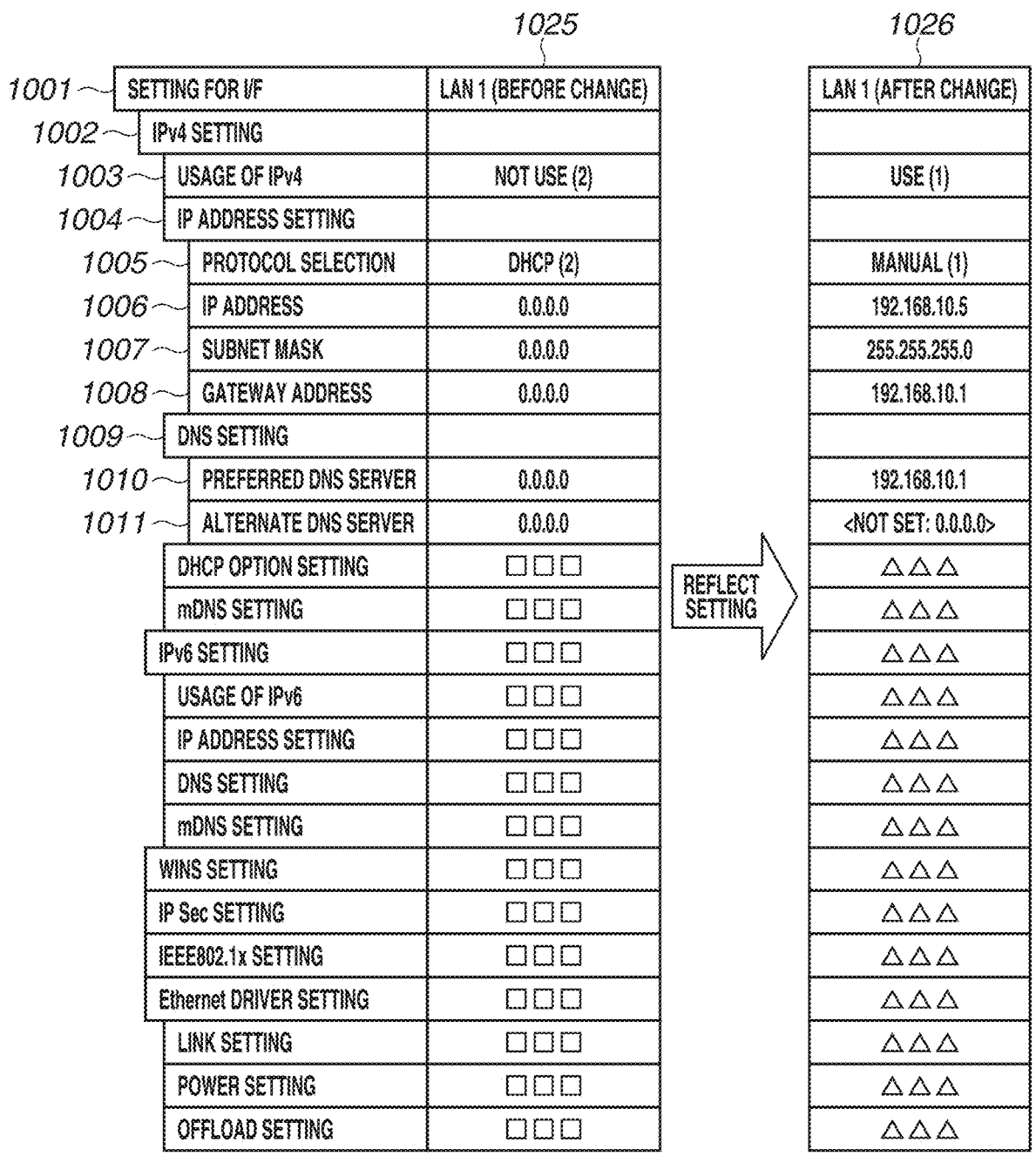
FIG. 14 is a diagram illustrating an example of a network setting change.

FIG. 14 is a diagram illustrating an example of lists before and after the change of the network setting associated with the first LAN I/F.

Figure 16:
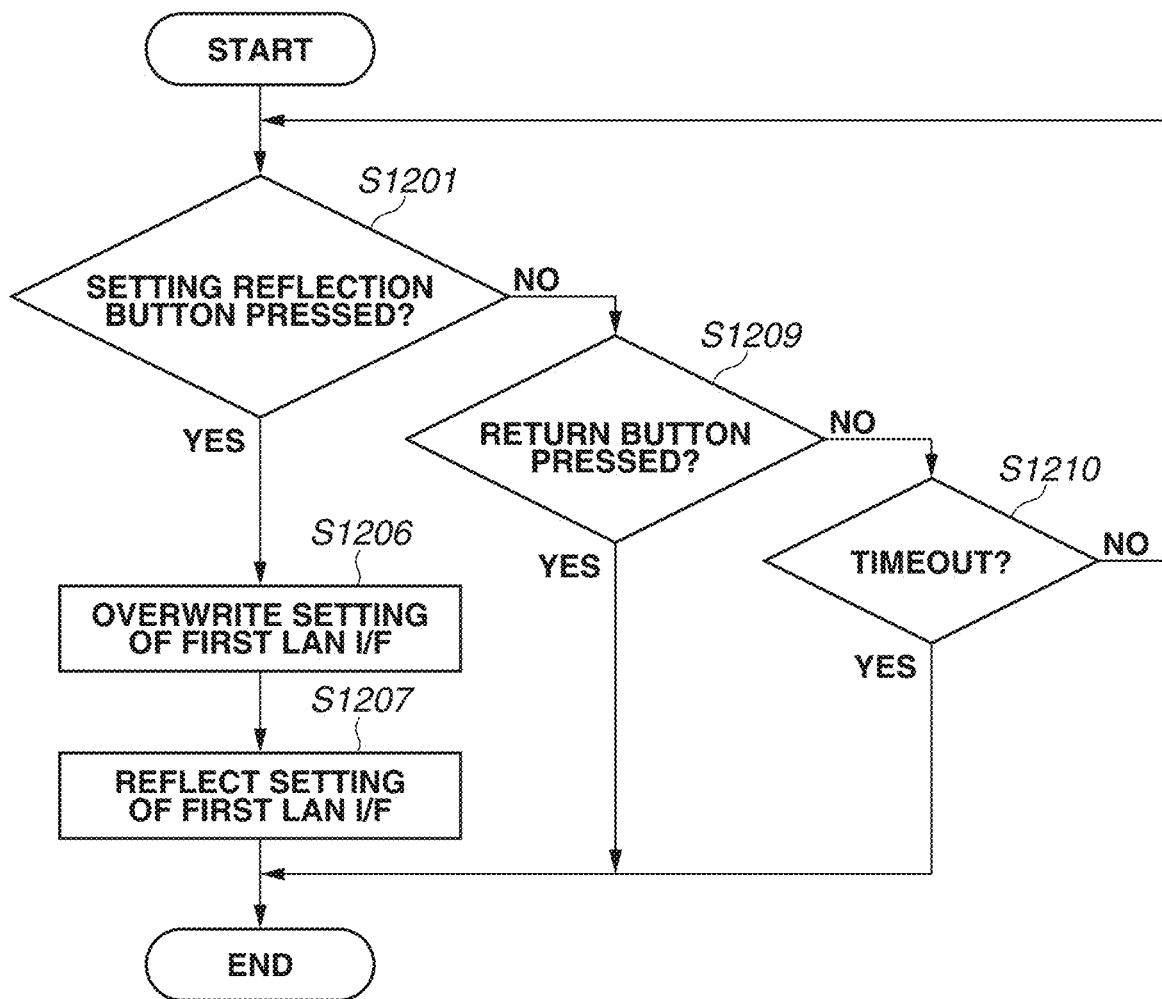
FIG. 16 is a flowchart illustrating an example of processing flow when a setting of the information processing apparatus is changed.

FIG. 16 is a flowchart illustrating an example of a processing flow performed when the setting of the information processing apparatus is changed. The CPU 204 reads out a program stored in the ROM 201 to the RAM 202 and executes the program, thereby achieving the processing in the flowchart of FIG. 16.

Figure 13:
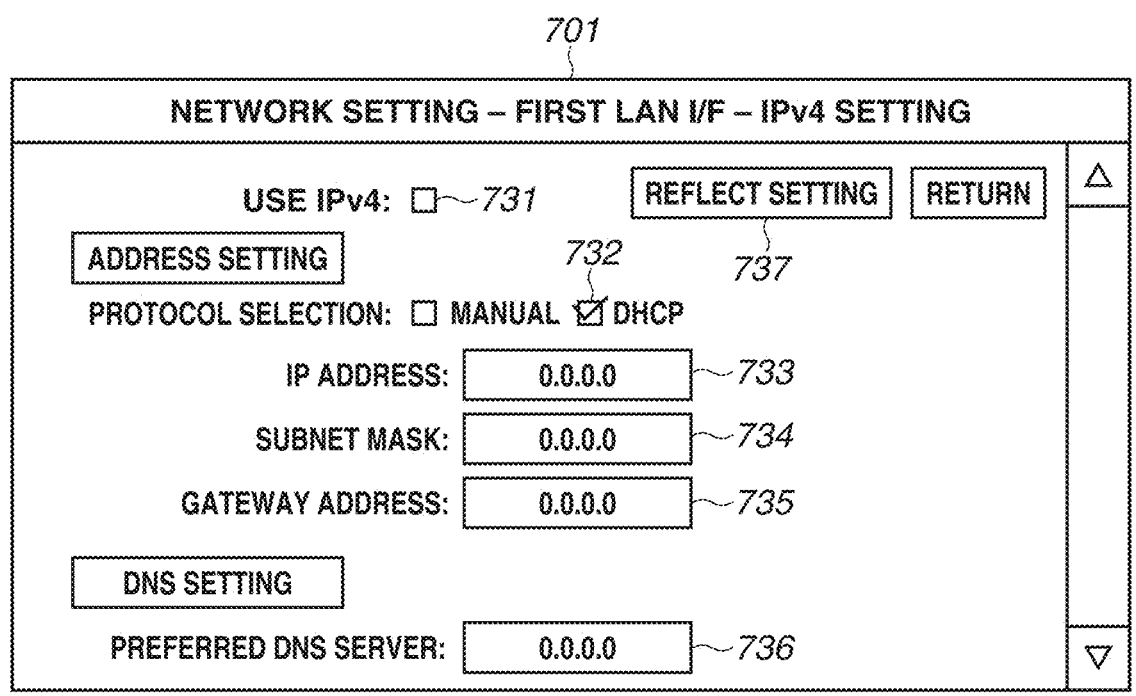
FIG. 13 is a diagram illustrating an example of a network setting screen.

A case where the IPv4 setting screen 701 in FIG. 13 is an example of the IPv4 setting screen not set at all in an initial state of the first LAN I/F 207, and the example of the setting screen after setting corresponds to FIG. 7A, is described.

In the initial state, a setting item 731 is set to a setting value of not using the IPv4 of the first LAN I/F 207. Further, as illustrated in a setting item 732, the protocol selection is set not to manual selection but to DHCP, and the setting values of various kinds of the IPv4 addresses in setting items 733 to 736 are also set to "0. 0. 0. 0" in the initial state.

A button 737 is to reflect the set contents set in the IPv4 setting screen 701.

When the user presses a button 737 after inputting the setting values of FIG. 8A through the remote UI displayed on the display unit of the client PC 110 or 120 in the state illustrated in FIG. 13, the setting is changed.

The setting values associated with the network I/F are rewritten from the setting values before the change in a list 1025 to the values after the change in a list 1026, in file data corresponding to the I/F stored in the HDD 203 as illustrated in FIG. 14.

Next, the flowchart illustrated in FIG. 16 is described. The flow in FIG. 16 is started when the CPU 204 receives the request to display the setting screen from the user and displays the setting screen on the display unit of the client PC 110 or 120 through the remote UI.

In step S1201, the CPU 204 determines whether input and change of the setting values have been performed by the user through the remote UI and the above-described button 737 has been pressed. In a case where it is determined that the button 737 has been pressed (YES in step S1201), the processing proceeds to step S1206. On the other hand, in a case where it is determined that the button 737 has not been pressed (NO in step S1201), the processing proceeds to step S1209.

In step S1206, the CPU 204 overwrites the setting values of the first LAN I/F 207 stored in the HDD 203 with the input changed values.

In step S1209, the CPU 204 determines whether the return button 713 has been pressed. In a case where it is determined that the return button 713 has been pressed (YES in step S1209), the screen is returned to the network setting screen 501 in FIG. 5A, and the processing ends. In a case where it is determined that the return button 713 has not been pressed (NO in step S1209), the processing proceeds to step S1210.

In step S1210, the CPU 204 determines whether a preset timeout time has elapsed. In a case where it is determined that the preset timeout time has elapsed (YES in step S1210), the screen is returned to the network setting screen 501 in FIG. 5A, and the processing ends. In a case where it is determined that the preset timeout time has not elapsed (NO in step S1210), the processing proceeds to step S1201.

In step S1207, the CPU 204 reflects the overwritten setting values on a file in a registry stored in the HDD 203. Thereafter, the screen is returned to the network setting screen 501 in FIG. 5A, and the processing ends.

The list according to the present exemplary embodiment stores the network I/F and the setting values of the network setting in association with each other, and the network I/F through which the display request has been received is determined and the setting screen is generated from the corresponding setting values. However, the configuration is not limited thereto. For example, a group ID and the setting values of the network setting may be stored in association with each other, a group ID included in the received display request may be acquired, and the setting screen may be generated from the corresponding setting values.

The setting screen of the network setting is described as an example of the setting screen according to the present exemplary embodiment. However, the setting screen is not limited thereto. For example, the setting screen may be a setting screen for language setting in the device setting managed for each network I/F.

According to the present exemplary embodiment, setting of an organization of a user using an information processing apparatus including a plurality of network interfaces is not changed by a user of another organization.

In the above description, an example in which a screen relating to setting such as a network setting of the information processing apparatus 100 is transmitted for each network I/F through which the display request has been received, has been described. In a second exemplary embodiment, an example in which the information processing apparatus 100 transmits a screen to display management information such as a job history and mail addresses, for each network I/F through which the display request has been received, is described.

FIG. 15 is a diagram illustrating an example of a list of management information managed by the information processing apparatus 100.

A list 1100 stores management information used and collected for each network I/F and management information common in the information processing apparatus 100 not associated with the network I/F. The list 1100 is stored in the HDD 203.

A data area 1101 stores, as common information, a toner state, a sheet remaining amounts, and an error state, which are management information common in the information processing apparatus 100 independent of the network I/F.

The toner state is acquired by, for example, a sensor that detects a remaining amount of toner in the information processing apparatus 100, and is stored by the CPU 204. The toner state has any of values "100%", "25%", and "none".

The sheet remaining amount is detected by the information processing apparatus 100 through, for example, detection by a sensor for detecting the lifting amount of a lifter provided on a tray where the sheets are set. Any of a state where "sheet remaining amount is small" and a state where "sheet remaining amount is zero" is stored by the CPU 204 based on a result of the detection.

As for the error state, a state of error occurred in the information processing apparatus 100 is stored by the CPU 204. For example, the CPU 204 detects occurrence of paper jam and other errors in a conveyance path of the information processing apparatus 100 by a sensor provided in the conveyance path. In a case where the jam occurs, the CPU 204 stores information indicating occurrence of the jam, as an error state.

In the data area 1102, the management information such as a history of print jobs received through the first LAN I/F 207 and an address book of users to use the first LAN I/F 207 is stored in association with the first LAN I/F 207. Further, in the data area 1102, charging information and other information on print processing executed through the first LAN I/F 207 are also stored. The history of print jobs is a history of print jobs executed by the information processing apparatus 100.

In a data area 1103, management information such as a history of print jobs received through the second LAN I/F 208 and an address book of users to use the second LAN I/F 208 is stored in association with the second LAN I/F 208. Further, in the data area 1103, charging information and other information on print processing executed through the second LAN I/F 208 are also stored.

The management information such as a print job history and an address book stored in the data areas 1102 and 1103 is stored in association with the network I/F used when the management information is acquired and used.

If a user in a group can browse the management information such as an address book, a use history, and a digital certificate of another user in another group, personal information and confidential information on an organization may flow out to the other group because the address book and the use history include such information. Accordingly, there is an existing technique for managing the management information such as an address book, a use history, and a digital certificate of the user with use of a department ID or other information in order to prevent the management information from being browsed by a user in another group. However, in the existing technology, it is necessary to allocate the department ID to each management information, which complicates management.

To solve this issue, in the present exemplary embodiment, the following processing is performed to prevent the management information on one group from being browsed by a user in another group, without troublesome management by the users to use the information processing apparatus including a plurality of network interfaces. The management information such as a print job history and an address book on one organization can be prevented from being browsed by a user of another organization. The present disclosure integrates the above described features into a practical application that improves a technological process associated with information processing.

Figure 17:
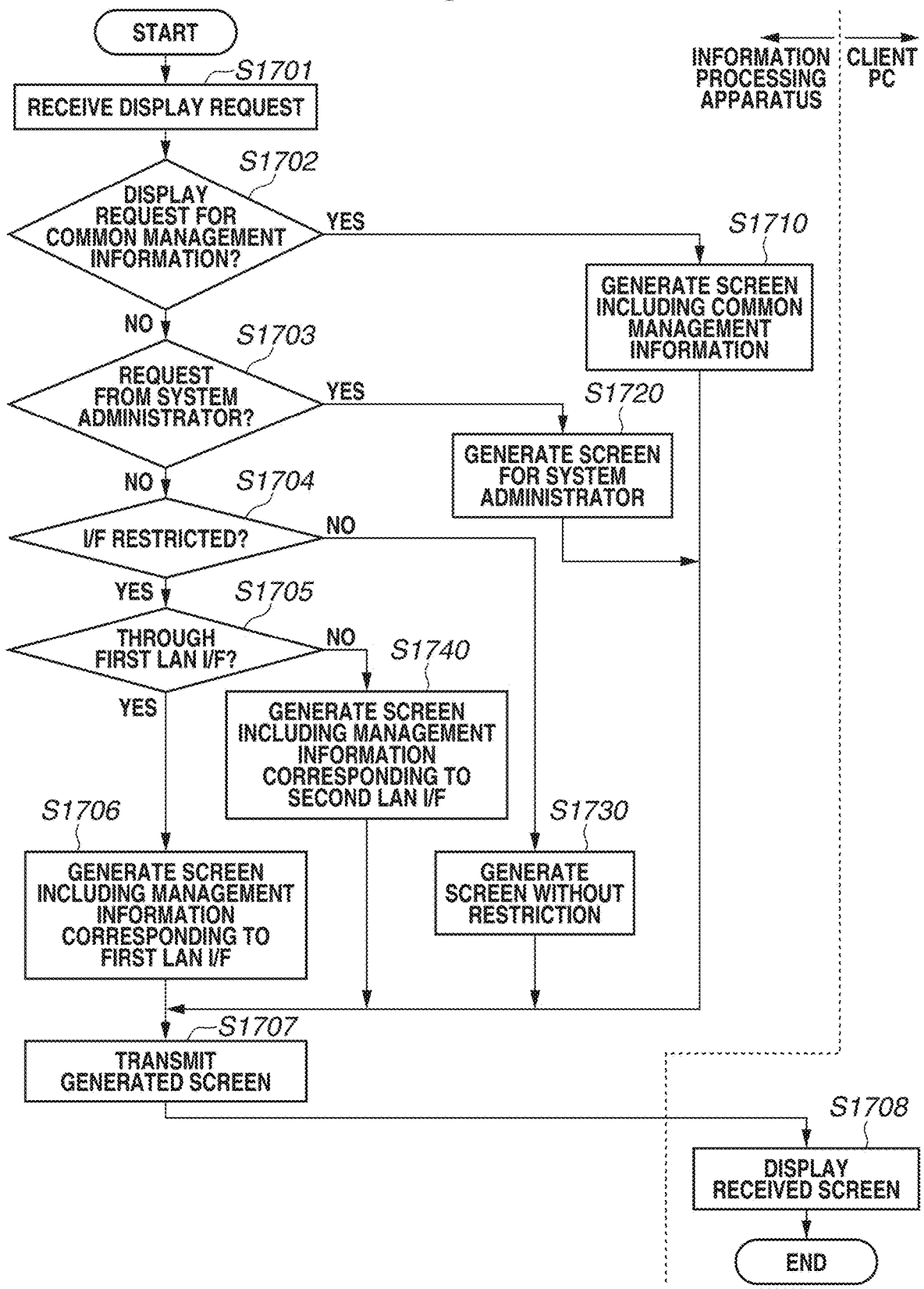
FIG. 17 is a flowchart illustrating an example of processing flow for displaying management information on the information processing apparatus and a client personal computer (PC).

FIG. 17 is a flowchart illustrating an example of processing flow to display management information on the information processing apparatus and the client PC. The CPU 204 reads out a program stored in the ROM 201 to the RAM 202 and executes the program, thereby implementing the processing in the flowchart of FIG. 17.

When the user performs display request for the management information stored in the above-described manner, from the display unit of the client PC 110 or 120 through the remote UI, the CPU 204 of the information processing apparatus 100 performs the following processing.

First, in step S1701, the CPU 204 receives a display request through the first LAN I/F 207 or the second LAN I/F 208.

Next, in step S1702, the CPU 204 determines whether the received display request is a display request for common management information. In a case where it is determined that the display request is a display request for common management information (YES in step S1702), the processing proceeds to step S1710. In a case where it is determined that the display request is not a display request for common management information (NO in step S1702), the processing proceeds to step S1703.

In step S1710, the CPU 204 generates a screen including the common management information.

Referring back to step S1702, a case where it is determined that the display request is not the display request for common management information (NO in step S1702) is described.

In step S1703, the CPU 204 determines whether the received display request has been issued from the system administrator. The determination is performed through determination whether the user ID as identification information of a user included in the display request corresponds to the system administrator. In a case where it is determined that the received display request has been issued from the system administrator (YES in step S1703), the processing proceeds to step S1720. In a case where it is determined that the received display request has not been issued from the system administrator (NO in step S1703), the processing proceeds to step S1704.

In step S1720, the CPU 204 generates a screen for the system administrator including the management information corresponding to the display request. The screen for the system administrator is, for example, a screen displaying both of management information associated with the first LAN I/F 207 and management information associated with the second LAN I/F 208, and a screen to set I/F restriction as illustrated in FIG. 7.

Referring back to step S1703, and a case where it is determined that the received display request has not been issued from the system administrator (NO in step S1703) is described.

In step S1704, the CPU 204 determines whether the I/F has been restricted, by referring to the setting value of the I/F restriction. In a case where it is determined that the I/F has been restricted (YES in step S1704), the processing proceeds to step S1705. On the other hand, in a case where it is determined that the I/F has not been restricted (NO in step S1704), the processing proceeds to step S1730. The I/F restriction used herein indicates restriction to prohibit display of the information not corresponding to the I/F through which the display request has been received. In a case where the I/F restriction has not been set, the information corresponding to all of the I/Fs is displayed irrespective of the I/F through which the display request has been received. In other words, the CPU 204 generates a screen including an index and buttons corresponding to the I/F different from the I/F through which the request has been received, as with the network setting screen 501 in FIG. 5A. The I/F restriction according to the present exemplary embodiment is settable by the system administrator and a service engineer of a sales company, as with the first exemplary embodiment.

In step S1730, the CPU 204 generates a screen that includes the management information corresponding to all of the I/Fs out of the management information requested by the received display request. The processing then proceeds to step S1707.

Referring back to step S1704, a case where it is determined that the I/F has been restricted (YES in step S1704) is described.

In step S1705, the CPU 204 determines whether the received display request has been received through the first LAN I/F 207. In a case where it is determined as the first LAN I/F 207 (YES in step S1705), the processing proceeds to step S1706. Otherwise (NO in step S1705), the processing proceeds to step S1740.

In step S1706, the CPU 204 generates a screen that includes the management information corresponding to the first LAN I/F 207 out of the management information requested by the received display request. The screen including the management information is generated by converting the management information associated with each LAN I/F stored in the HDD 203 as illustrated in FIG. 15 into data to be displayed on a web browser of an external PC other than the operation unit 200.

Referring back to step S1705, a case where it is determined that the display request has not been received through the first LAN I/F 207 (NO in step S1705) is described.

In step S1740, the CPU 204 generates a screen that includes the management information corresponding to the second LAN I/F 208 out of the management information requested by the received display request.

In step S1707, the CPU 204 transmits the generated screen to the client PC 110 or the client PC 120.

Now, the processing flow by the client PC 110 or the client PC 120 is described.

In step S1708, the client PC 110 or the client PC 120 receives the screen transmitted in step S1707, and displays the received screen on the display unit.

Figure 18A:
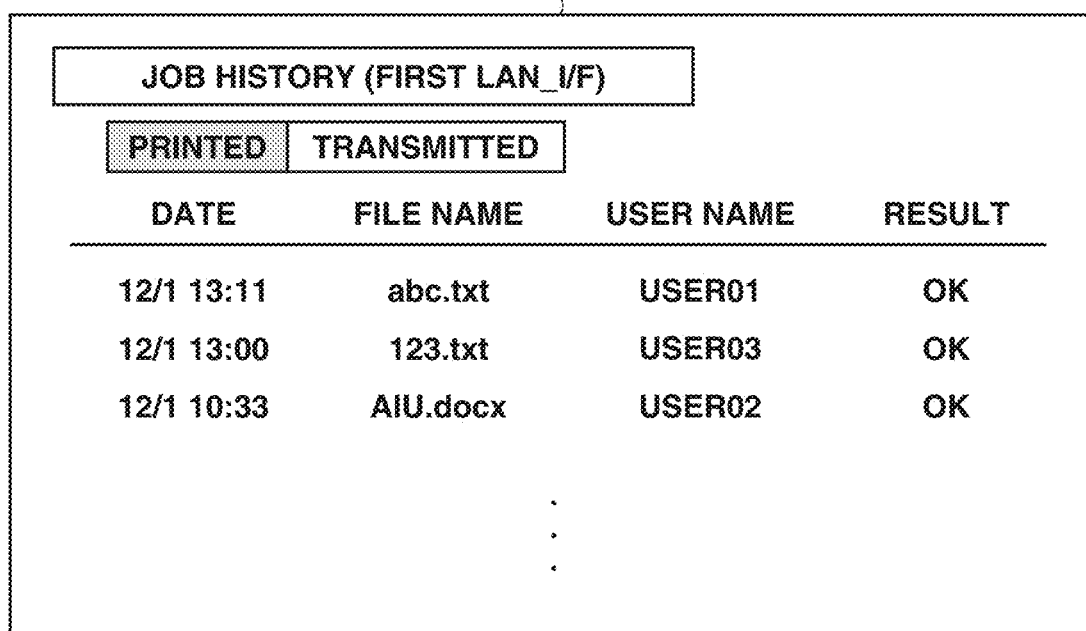
FIGS. 18A and 18B are diagrams each illustrating an example of a screen displayed on the client PC.
Figure 18B:
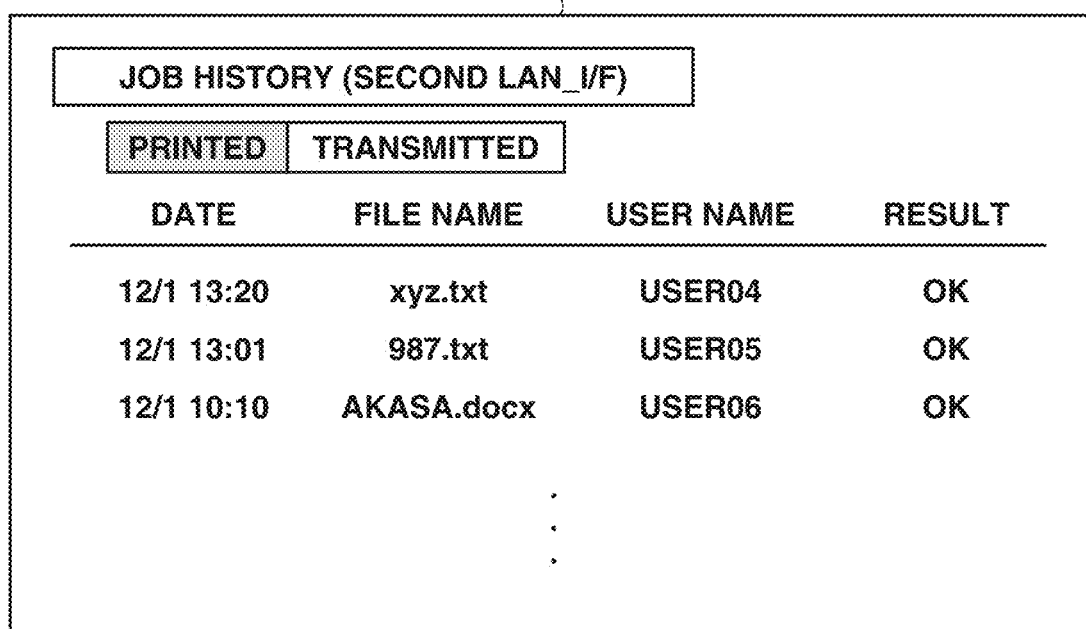

FIGS. 18A and 18B are diagrams each illustrating an example of a screen displayed on the client PC.

FIG. 18A is a diagram illustrating an example of a screen displayed on the display unit of the client PC 110 in a case where the display request for print job history is received through the first LAN I/F 207.

A screen 1801 is an example of the screen generated in step S1706 in the flow of FIG. 17.

FIG. 18B is a diagram illustrating an example of the screen displayed on the display unit of the client PC 120 in a case where the display request for a print job history is received through the second LAN I/F 208.

A screen 1802 is an example of the screen generated in step S1740 in the flow of FIG. 17.

The list according to the present exemplary embodiment stores the network I/F and the management information in association with each other, and the management information to be displayed is determined through determination of the network I/F through which the display request has been received. However, the configuration is not limited thereto. For example, a group ID and the management information may be stored in association with each other, and the management information to be displayed may be determined by acquiring the group ID included in the received display request.

According to the present exemplary embodiment, the management information such as a print job history and an address book on one organization can be prevented from being browsed by a user of another organization. The present disclosure integrates the above described features into a practical application that improves a technological process associated with information processing.

The units described throughout the present disclosure are exemplary and/or preferable modules for implementing processes described in the present disclosure. The term "unit", as used herein, may generally refer to firmware, software, hardware, or other component, such as circuitry or the like, or any combination thereof, that is used to effectuate a purpose. The modules can be hardware units (such as circuitry, firmware, a field programmable gate array, a digital signal processor, an application specific integrated circuit, or the like) and/or software modules (such as a computer readable program or the like). The modules for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the present disclosure.

Other Embodiments

The functions of the present disclosure can be achieved by supplying a storage medium in which program codes achieving the functions of the above-described exemplary embodiments, to a system or an apparatus, and causing a computer (or CPU, micro processing unit (MPU)) of the system or the apparatus to read out the program codes stored in the storage medium. In this case, the program codes themselves read out from the storage medium achieve the functions of the above-described exemplary embodiments, and the program codes configure the present disclosure.

Further, a case where the computer executes the read program codes to implement the functions of the above-described exemplary embodiments is also included in the present disclosure. In addition, a case where an operating system (OS) and/or other programs operating on the computer performs a part or all of the actual processing based on instructions by the program codes, and the functions of the above-described exemplary embodiments are achieved by the processing is also included in the present disclosure.

According to the present exemplary embodiments, the management information on one group can be prevented from being changed by a user in another group, without troublesome management by a user using the information processing apparatus including the plurality of network interfaces.

Embodiment(s) of the present disclosure can also be realized by a computerized configuration(s) of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computerized configuration(s) of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computerized configuration(s) may comprise one or more processors, one or more memories, circuitry, or a combination thereof (e.g., central processing unit (CPU), micro processing unit (MPU)), and may include a network of separate computers or separate processors to read out and execute the computer executable instructions. The computerized configuration(s) executable instructions may be provided to the computerized configuration(s), for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2018-086500, filed Apr. 27, 2018, which is hereby incorporated by reference herein in its entirety.

What is claimed is:

1. An information processing apparatus comprising:
a first network interface configured to perform network communication externally;
a second network interface different from the first network interface and configured to perform network communication externally, wherein the first network interface and the second network interface are able to become connected to external networks different from each other and wherein both of the first network interface and the second network interface of the information processing apparatus are wired network interfaces or both of the first network interface and the second network interface of the information processing apparatus are wireless network interfaces;
a storage device, wherein management information including first management information corresponding to the first network interface and second management information corresponding to the second network interface is stored in the storage device; and
at least one processer that executes a set of instructions, the instructions, when executed, causing the information processing apparatus to perform operations comprising
providing a first setting screen to an external apparatus,
wherein, in a case where an acquisition request for acquiring the first setting screen is received from a first external apparatus via the first network interface, the first setting screen on which the first management information is changeable and the second management information is not changeable is provided to the first external apparatus, and
wherein, in a case where the acquisition request for acquiring the first setting screen is received from a second external apparatus via the second network interface, the first setting screen on which the first management information is not changeable and the second management information is changeable is provided to the second external apparatus,
wherein the operations further comprise
setting whether to prohibit change from management information corresponding to one of the first network interface and the second network interface to management information corresponding to other of the first network interface and the second network interface, as an operation setting of the information processing apparatus,
wherein in a case where not to prohibit the change is set as the operation setting and in a case where the acquisition request for acquiring the first setting screen is received from any of the network interface, the first setting screen on which both of the first management information and the second management information are changeable is provided to an external apparatus that sent the acquisition request.

2. The information processing apparatus according to claim 1, wherein the operations further comprise
setting a first setting in which the first management information is not changeable through the second network interface and the second management information is not changeable through the first network interface by the information processing apparatus, and a second setting in which the first management information is changeable through the second network interface and the second management information is changeable through the first network interface by the information processing apparatus.

3. The information processing apparatus according to claim 2, wherein the operations further comprise
determining, based on identification information included in the acquisition request for acquiring the first setting screen for changing the management information, whether or not the acquisition request is an acquisition request by a user who has first authority, and
controlling such that, in a case where the acquisition request is determined to be an acquisition request by a user who has the first authority, the first management information and the second management information are permitted to be changed by an operation by the user via the first setting screen.

4. The information processing apparatus according to claim 3, wherein, the first authority is administrator authority, and the user having the first authority is allowed to set the first setting or the second setting via a second setting screen.

5. The information processing apparatus according to claim 4, wherein the first management information is network setting of the first network interface, and the second management information is network setting of the second network interface.

6. The information processing apparatus according to claim 1,
wherein the information processing apparatus has a data transmission function,
wherein, in the information processing apparatus, an address book to be used for the data transmission function is managed for each network interface individually, and
wherein the first management information is management information of an address book associated with the first network interface, and the second management of an address book associated with the second network interface.

7. A control method for controlling an information processing apparatus including
a first network interface configured to perform network communication externally,
a second network interface different from the first network interface and configured to perform network communication externally, wherein the first network interface and the second network interface are able to become connected to external networks different from each other and wherein both of the first network interface and the second network interface of the information processing apparatus are wired network interfaces or both of the first network interface and the second network interface of the information processing apparatus are wireless network interfaces, and
a storage device, wherein management information including first management information corresponding to the first network interface and second management information corresponding to the second network interface is stored in the storage device, the control method comprising:
providing a first setting screen to an external apparatus,
wherein, in a case where an acquisition request for acquiring the first setting screen is received from a first external apparatus via the first network interface, the first setting screen on which the first management information is changeable and the second management information is not changeable is provided to the first external apparatus, and
wherein, in a case where the acquisition request for acquiring the first setting screen is received from a second external apparatus via the second network interface, the first setting screen on which the first management information is not changeable and the second management information is changeable is provided to the second external apparatus,
wherein the control method further comprises
setting whether to prohibit change from management information corresponding to one of the first network interface and the second network interface to management information corresponding to other of the first network interface and the second network interface, as an operation setting of the information processing apparatus, wherein in a case where not to prohibit the change is set as the operation setting and in a case where the acquisition request for acquiring the first setting screen is received from any of the network interface, the first setting screen on which both of the first management information and the second management information are changeable is provided to an external apparatus that sent the acquisition request.

8. A non-transitory computer-readable storage medium storing a program for causing a computer to execute a method for controlling an image processing apparatus including
a first network interface configured to perform network communication externally,
a second network interface different from the first network interface and configured to perform network communication externally, wherein the first network interface and the second network interface are able to become connected to external networks different from each other and wherein both of the first network interface and the second network interface of the information processing apparatus are wired network interfaces or both of the first network interface and the second network interface of the information processing apparatus are wireless network interfaces, and
a storage device, wherein management information including first management information corresponding to the first network interface and second management information corresponding to the second network interface is stored in the storage device, the method comprising:
providing a first setting screen to an external apparatus,
wherein, in a case where an acquisition request for acquiring the first setting screen is received from a first external apparatus via the first network interface, the first setting screen on which the first management information is changeable and the second management information is not changeable is provided to the first external apparatus, and
wherein, in a case where the acquisition request for acquiring the first setting screen is received from a second external apparatus via the second network interface, the first setting screen on which the first management information is not changeable and the second management information is changeable is provided to the second external apparatus,
wherein the method further comprises
setting whether to prohibit change from management information corresponding to one of the first network interface and the second network interface to management information corresponding to other of the first network interface and the second network interface, as an operation setting of the information processing apparatus,
wherein in a case where not to prohibit the change is set as the operation setting and in a case where the acquisition request for acquiring the first setting screen is received from any of the network interface, the first setting screen on which both of the first management information and the second management information are changeable is provided to an external apparatus that sent the acquisition request.

* * * * *